(12) United States Patent
Holz

(10) Patent No.: US 9,386,298 B2
(45) Date of Patent: Jul. 5, 2016

(54) THREE-DIMENSIONAL IMAGE SENSORS

(71) Applicant: Leap Motion, Inc., San Francisco, CA (US)

(72) Inventor: David Holz, San Francisco, CA (US)

(73) Assignee: Leap Motion, Inc., San Francisco, CA (US)

( * ) Notice: Subject to any disclaimer, the term of this patent is extended or adjusted under 35 U.S.C. 154(b) by 243 days.

(21) Appl. No.: 14/075,792

(22) Filed: Nov. 8, 2013

(65) Prior Publication Data

US 2014/0125775 A1  May 8, 2014

Related U.S. Application Data

(60) Provisional application No. 61/724,078, filed on Nov. 8, 2012.

(51) Int. Cl.
*H04N 13/02* (2006.01)
*H04N 13/00* (2006.01)

(52) U.S. Cl.
CPC ....... *H04N 13/0217* (2013.01); *H04N 13/0228* (2013.01); *H04N 2013/0081* (2013.01)

(58) Field of Classification Search
None
See application file for complete search history.

(56) References Cited

U.S. PATENT DOCUMENTS

| | | | | |
|---|---|---|---|---|
| 8,305,456 B1 * | 11/2012 | McMahon | ........... | H04N 5/2258 348/207.1 |
| 8,866,920 B2 * | 10/2014 | Venkataraman | ..... | H04N 5/2253 348/218.1 |
| 2005/0254817 A1 * | 11/2005 | McKee | ................. | G03B 35/08 396/544 |
| 2009/0167922 A1 * | 7/2009 | Perlman | ............... | H04N 5/3572 348/340 |
| 2009/0315982 A1 * | 12/2009 | Schmidt | ............. | H04N 13/0025 348/47 |
| 2010/0007717 A1 * | 1/2010 | Spektor | ................... | G06F 3/005 348/43 |
| 2011/0080487 A1 | 4/2011 | Venkataraman et al. | | |
| 2011/0211068 A1 * | 9/2011 | Yokota | ................... | H04N 7/181 348/139 |
| 2011/0221599 A1 * | 9/2011 | Hogasten | .......... | H01L 27/14609 340/632 |
| 2012/0019623 A1 * | 1/2012 | Kokuwa | ................... | G02B 7/38 348/47 |
| 2012/0105593 A1 * | 5/2012 | Berestov | ............ | G02B 27/1066 348/49 |
| 2012/0249744 A1 * | 10/2012 | Pesach | ............. | H01L 27/14621 348/46 |
| 2012/0274811 A1 * | 11/2012 | Bakin | .................. | H04N 3/1593 348/239 |
| 2013/0321668 A1 * | 12/2013 | Kamath | ............... | H04N 5/2253 348/239 |

OTHER PUBLICATIONS

Venkataram, K., et al., "PiCam: An Ultra-Thin High Performance Monolithic Camera Array," Columbia University, Oct. 2013, pp. 1-13.

\* cited by examiner

*Primary Examiner* — Jay Patel
*Assistant Examiner* — Reza Aghevli
(74) *Attorney, Agent, or Firm* — Haynes Beffel & Wolfeld LLP; Ernest J. Beffel, Jr.

(57) ABSTRACT

An image sensor frame rate can be increased by "interlaced" mode operation whereby only half the number of lines (alternating between odd and even lines) of an image is transported to the readout circuitry. This halves the integration time but also halves the resolution of the sensor. The reduction is tolerable for motion characterization as long as sufficient image resolution remains. Accordingly, in one embodiment, an image sensor operated in an interlaced fashion is first exposed to a scene under a first illumination form (e.g., narrowband illumination), and a first set of alternating (horizontal or vertical) lines constituting half of the pixels is read out of the array; the sensor is then exposed to the same scene under a second illumination form (e.g., existing ambient illumination with the illumination source turned off), and a second set of alternating lines, representing the other half of the pixel array, is read out.

11 Claims, 2 Drawing Sheets

THREE-DIMENSIONAL IMAGE SENSORS

PRIORITY

This application claims the benefit of U.S. Provisional Patent Application No. 61/724,078, filed 8 Nov. 2012, which is incorporated herein by reference.

TECHNOLOGY FIELD

The technology disclosed generally relates to imaging systems and in particular to three-dimensional (3D) object detection, tracking and characterization using optical imaging.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Motion-capture systems are used in a variety of contexts to obtain information about the configuration and motion of various objects, including objects with articulating members, such as human hands or human bodies. Such systems generally include cameras to capture sequential images of an object in motion and computers to analyze the images to create a reconstruction of an object's volume, position and motion.

Two or more cameras are often used for capturing the 3D motion of the object. Parameters such as a location and viewing angle of the tracked object with respect to each camera are typically required to create the 3D reconstruction of the object's volume. Employing multiple cameras, however, increases cost and may impose cumbersome size and configuration requirements. Systems for tracking a moving object may, for example, be implemented in mobile devices, which are highly space-constrained.

It is desirable to provide a motion-capture system that can economically and effectively track 3D motion using a single camera.

SUMMARY

The technology disclosed relates to systems and methods for capturing images of the object in motion using a single camera but providing sufficient parameters to create a reconstructed 3D model of the object. Multiple lenses are placed above an image sensor of a camera; the image sensor of the camera is divided into multiple regions, each containing a fraction of the image sensor associated with one of the lenses. Because each region receives an optically independent image of the object from a specific angle and lens position and each region is located adjacent to other regions, the lens array and sensor collectively act as multiple small cameras positioned next to each other. The technology disclosed reduces the number of cameras required to create 3D images in a motion-capture system.

Other aspects and advantages of the technology disclosed can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Figure 1:
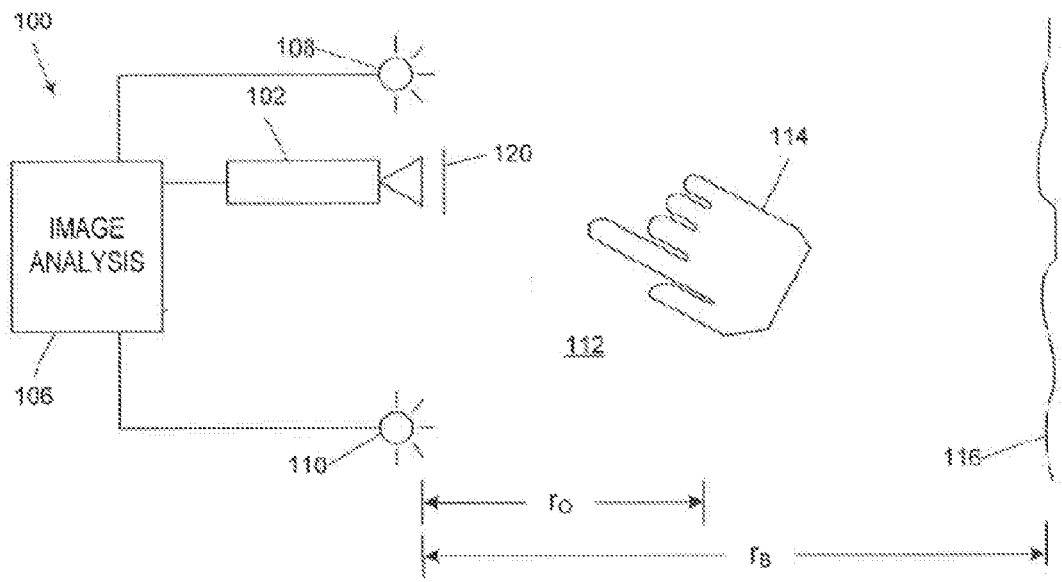
FIG. 1 illustrates a system including one camera coupled an image-analysis system for capturing 3D image data of an object.

FIG. 1 illustrates a system 100 including one camera 102 coupled to an image-analysis system 106 for capturing 3D image data of an object (e.g., a hand) 114. The term "camera" herein generally refers to any device (or combination of devices) capable of capturing an image of the object 114 and representing that image in the form of digital data. For example, line sensors or line cameras rather than conventional devices that capture a two-dimensional (2D) image may be employed. The camera 102 is capable of capturing video images (i.e., successive image frames at a constant rate of, for example, 15 or more frames per second). The camera 102 may have various frame rates, image resolutions (e.g., pixels per image), wavelength sensitivities or intensity resolutions (e.g., numbers of bits of intensity data per pixel), lens focal lengths, depths of field, etc. In general, for a particular application, any camera(s) capable of focusing on objects within a spatial volume of interest may be used. For instance, to capture motion of the hand of an otherwise stationary person, the volume of interest might be defined as a cube approximately one meter on a side. The camera 102 may be sensitive to light across the visible spectrum or, more typically, with enhanced sensitivity to a confined wavelength band (e.g., the infrared (IR) or ultraviolet bands).

Figure 2:
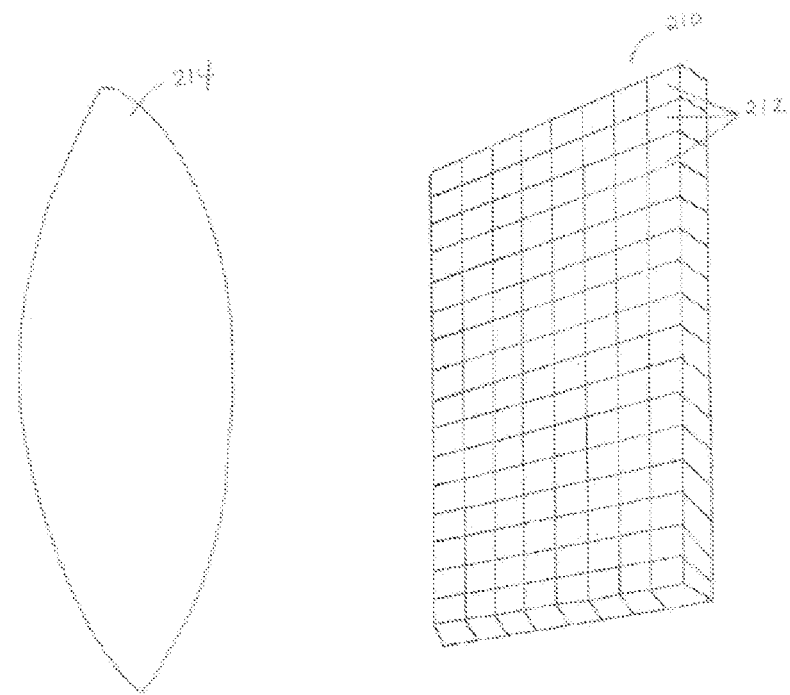
FIG. 2 illustrates a camera including an image sensor having an array of light-sensitive picture elements or pixels.

As illustrated in FIG. 2, the camera 102 includes image sensors 210, each having an array of light-sensitive picture elements (pixels) 212. During operation, an image of the object is first projected through a lens 214 onto the surface of the image sensor 210 located at the focal plane of the lens 214, while the image is formed as the light strikes the pixels with varying intensity. As a result, each pixel 212 converts the light into an electric charge that is proportional to the intensity of the detected light. In one implementation, the camera utilizes a charge-couple device (CCD) sensor; the electric charge for each pixel 212 is transported to a single structure that converts the charge into a measurable voltage using a controlling circuit (not shown) in the camera. This is achieved by sequentially shifting the charge in each pixel to its neighbor, row by row and then column by column in "bucket brigade" fashion, until it reaches the measurement structure. In another implementation, the camera uses a complementary metal-oxidesemiconductor (CMOS) sensor that places a measurement structure at each pixel location. The measurable voltages are transferred directly from each location of the pixels to the output of the sensor. The measurable voltages are then sampled and digitized as digital data, which are stored in a memory for further processing.

Figure 3:
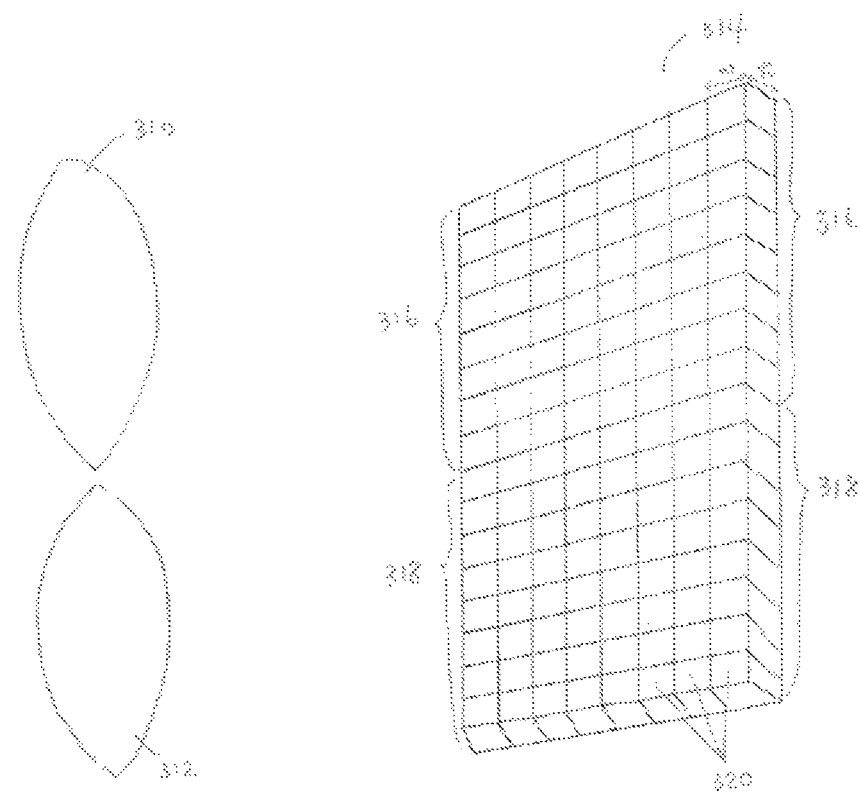
FIG. 3 illustrates a pair of lenses positioned next to each other and are spaced apart from an image sensor.

In general, image-sensor pixels 212 are more sensitive to light intensity than to wavelength, i.e., color. The lens 214 focuses the light and intensity on the active portion of the sensor 210. FIG. 3 illustrates a pair of lenses 310, 312 positioned next to each other that are spaced apart from the image sensor 314 so that light from an object within the lenses' respective fields of view is be focused onto corresponding regions 316, 318. In particular, the lenses 310, 312 independently project two images onto the adjacent sensor regions 316, 318. These two images have sufficient parallax to characterize the object stereoscopically, and as a result, the 3D motion of the object may be tracked. Multiple lenses with sufficient spacing relative to the lens-to-object distance, therefore, obviate the need for separate cameras to track 3D motion.

To track the 3D motion of the object, the projected images on the adjacent sensor regions 316, 318 may be captured from different fields of view that are at least partially overlapping to create a stereo image. Accordingly, the spacing between the lenses 310, 312 as well as the distance between the sensor 314 and the lenses 310, 312 depends on the focal length of the lenses, the distance from the lenses of the object being tracked, and the size of the sensor regions. The spacing and distance parameters may be adjusted based on the distance between the tracked object and the lenses 310, 312, or may be fixed based on an expected distance.

In the configuration illustrated in FIG. 3, the image sensor 314 has an aspect ratio larger than one (i.e., the width w is larger than the height h of each pixel sensor 320). In one implementation, the multiple lenses are employed in, for example, a mobile device, to track the 3D motion of an object using as few as one camera; this reduces the required volume occupied by multiple cameras in the mobile device. The technology disclosed is not limited to any particular number of lenses (e.g., lenses 310, 312), however; any number lenses may be used as dictated by the application, e.g., to augment the accuracy of the 3D image information.

The image-analysis system 106 illustrated in FIG. 1 (also referred to as an image analyzer) may include any device or device component that is capable of capturing multiple images as described herein. In addition, the image analysis system 106 may analyze the captured images and merge them into a single 3D image that contains depth information for the object. For example, pixels corresponding to the object may be tagged with a depth value (in addition to values conventionally specifying brightness, etc.); alternatively, the field monitored by the camera 102 may be represented as a 3D coordinate system and the object pixels recorded by the sensor transformed into "voxels" in 3D space based on the depth values. In the latter approach, the object is fully represented and tracked spatially.

Figure 4:
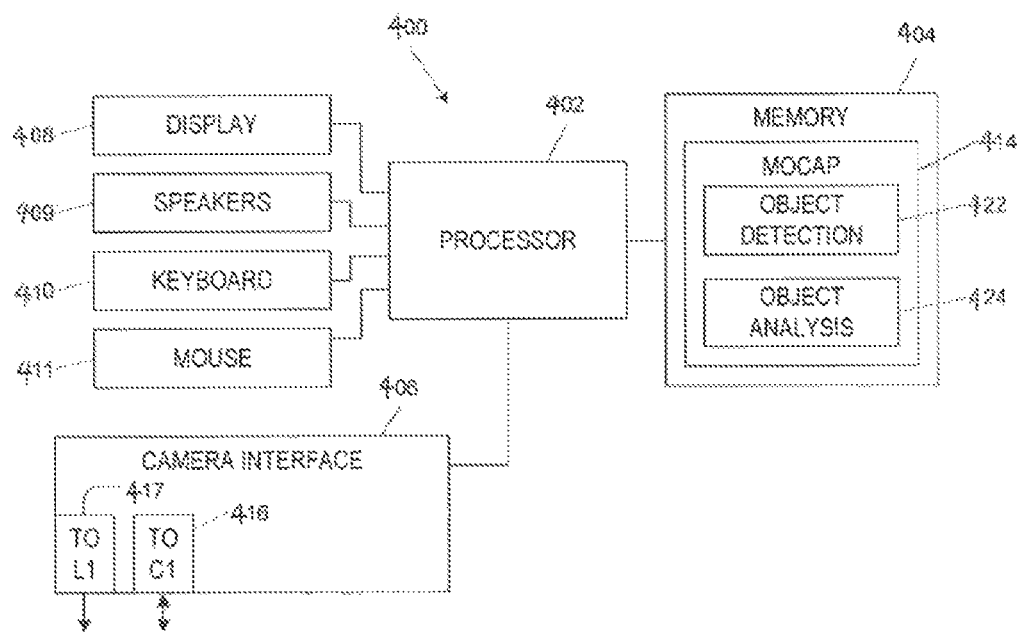
FIG. 4 is a simplified block diagram of a computer system implementing an image-analysis system.

FIG. 4 is a simplified block diagram of an example computer system 400 implementing the image-analysis system 106. Computer system 400 includes a processor 402, a memory 404, a camera interface 406, a display 408, speakers 409, a keyboard 410, and a mouse 411.

Memory 404 can be used to store instructions to be executed by processor 402 as well as input and/or output data associated with execution of the instructions. In particular, memory 404 contains instructions, conceptually illustrated as a group of modules described in greater detail below, that control the operation of processor 402 and its interaction with the other hardware components. An operating system directs the execution of low-level, basic system functions such as memory allocation, file management and operation of mass storage devices. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Processor 402 may be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the steps of the processes of the technology disclosed.

Camera interface 406 can include hardware and/or software that enables communication between computer system 400 and a camera such as the camera 102 shown in FIG. 1, as well as associated light sources such as light sources 108, 110 of FIG. 1. The camera interface 406 in the technology disclosed may include as few as one data port 416 to which the camera can be connected, as well as hardware and/or software signal processors to modify data signals received from the camera (e.g., to reduce noise or reformat data) prior to providing the signals as inputs to a conventional motion-capture ("mocap") program 414 executing on processor 402. In some implementations, camera interface 406 can also transmit signals to the camera, e.g., to activate or deactivate the camera 102, to control camera settings (frame rate, image quality, sensitivity, etc.), or the like. Such signals can be transmitted, e.g., in response to control signals from processor 402, which may in turn be generated in response to user input or other detected events. Camera interface 406 may facilitate at least one camera (e.g., camera 102).

Camera interface 406 can also include a controller 417 to which light sources (e.g., light sources 108, 110 in FIG. 1) can be connected. In some implementations, the controller 417 supplies operating current to the light sources, e.g., in response to instructions from processor 402 executing mocap program 414. In other implementations, the light sources can draw operating current from an external power supply (not shown), and the controller 417 can generate control signals for the light sources, e.g., instructing the light sources to be turned on or off or changing the brightness. In some implementations, a single controller can be used to control multiple light sources.

Instructions defining mocap program 414 are stored in memory 404, and these instructions, when executed, perform motion-capture analysis on images supplied from the camera 102 connected to camera interface 406. In one implementation, mocap program 414 includes various modules, such as an object detection module 422 and an object analysis module 424. Execution of object detection module 422 by processor 402 can cause processor 402 to operate camera interface 406 to capture images of an object and to distinguish object pixels from background pixels by analyzing the image data. Object detection module 422 can analyze images (e.g., images captured via camera interface 406) to detect edges of an object therein and/or other information about the object's location. Object analysis module 424 can analyze the object information provided by object detection module 422 to determine the 3D position and/or motion of the object. Memory 404 can also include other information and/or code modules used by mocap program 414.

Display 408, speakers 409, keyboard 410, and mouse 411 can be used to facilitate user interaction with computer system 400. These components can be of generally conventional design or modified as desired to provide any type of user interaction. In some implementations, results of motion capture using camera interface 406 and mocap program 414 can be interpreted as user input. For example, a user can perform hand gestures that are analyzed using mocap program 414, and the results of this analysis can be interpreted as an instruction to some other program executing on processor 400 (e.g., a web browser, word processor, or other application). Thus, by way of illustration, a user might use upward or downward swiping gestures to "scroll" a webpage currently displayed on display 408, to use rotating gestures to increase or decrease the volume of audio output from speakers 409, and so on.

It will be appreciated that computer system 400 is illustrative and that variations and modifications are possible. Computer systems can be implemented in a variety of form factors, including server systems, desktop systems, laptop systems, tablets, smart phones or personal digital assistants, and so on. A particular implementation may include other functionality not described herein, e.g., wired and/or wireless network interfaces, media playing and/or recording capability, etc. In some implementations, one or more cameras may be built into the computer rather than being supplied as separate components. Further, an image analyzer can be implemented using only a subset of computer system components (e.g., as a processor executing program code, an ASIC, or a fixed-function digital signal processor, with suitable I/O interfaces to receive image data and output analysis results).

While computer system 400 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired.

Thus, although the technology disclosed has been described with respect to specific embodiments, it will be appreciated that the technology disclosed is intended to cover all modifications and equivalents within the scope of the following claims.

Particular Implementations

One implementation describes a camera for capturing images of an object. The camera includes a single image sensor including an array of light-sensing pixels and a plurality of lenses that focus light transmitted from an object onto a plurality of different pixel regions of the image sensor, each lens focusing light on a different one of the pixel regions.

This camera and other implementations of the technology disclosed include one or more the following features and/or features described in connection with additional methods disclosed. In the interest of conciseness, the combinations of features disclosed in this application are not individually enumerated and are not repeated with each bases set of features. Features identified in the section can readily be combined with sets of base features discussed throughout this application.

The single image sensor can be an infrared or ultraviolent sensor with enhanced sensitivity in an infrared or ultraviolent wavelength band.

The camera can further include a processor coupled to the image sensor that generates a depth map that calculates depth values for pixels of at least the object, based on the images received in the different pixel regions. The camera also includes an object detection module running on a processor that detects 3D motion of the object using the depth values. The processor coupled to the image sensor can further map the object into voxels in 3D space based on the depth map.

The camera configuration can have the plurality of lenses are positioned next to each other. The lenses can comprise convex lenses. The camera configuration can also have an array of light-sensing pixels that has an aspect ratio larger than one. It can also include the distance between the image sensor and the plurality of lenses being determined based on a distance between the object and the lenses.

Another system implementation describes a camera for capturing images of an object that includes a single image sensor including an array of uniformly and continuously spaced light-sensing pixels and a plurality of lenses. The lenses focus light transmitted from an object onto a plurality of different pixel regions of the image sensor, each lens focusing light on a different one of the pixel regions.

This system and other implementations of the technology disclosed include one or more the following features and/or features described in connection with additional methods disclosed.

The single image sensor can be an infrared or ultraviolent sensor with enhanced sensitivity in an infrared or ultraviolent wavelength band.

The system can further include a processor coupled to the image sensor that generates a depth map that calculates depth values for pixels of at least the object, based on the images received in the different pixel regions. The system also includes an object detection module running on a processor that detects 3D motion of the object using the depth values. The processor coupled to the image sensor can further map the object into voxels in 3D space based on the depth map.

The system can have the plurality of lenses are positioned next to each other. The lenses can comprise convex lenses. The system can also have an array of light-sensing pixels that has an aspect ratio larger than one. It can also include the distance between the image sensor and the plurality of lenses being determined based on a distance between the object and the lenses.

Another implementation describes a method counterpart of the system above, a method of capturing images of an object using a camera comprising an image sensor having an array of light-sensing pixels and a plurality of lenses, each lens focusing light on one of pixel regions of the image sensor. The method includes focusing light transmitted from the object onto a plurality of different pixel regions of the image sensor and capturing a plurality of images, each associated with one of the pixel regions of the image sensor.

This method and other implementations of the technology disclosed include one or more the following features and/or features described in connection with additional methods disclosed.

The single image sensor can be an infrared or ultraviolent sensor with enhanced sensitivity in an infrared or ultraviolent wavelength band.

The method can further include a processor coupled to the image sensor that generates a depth map that calculates depth values for pixels of at least the object, based on the images received in the different pixel regions. The method also includes an object detection module running on a processor that detects 3D motion of the object using the depth values. The processor coupled to the image sensor can further map the object into voxels in 3D space based on the depth map.

The method can have the plurality of lenses are positioned next to each other. The lenses can comprise convex lenses. The method can also have an array of light-sensing pixels that has an aspect ratio larger than one. It can also include the distance between the image sensor and the plurality of lenses being determined based on a distance between the object and the lenses.

In another implementation, an image capture and analysis system is described. The system includes a camera oriented toward a field of view. The camera includes a single image sensor including an array of uniformly and continuously spaced light-sensing pixels and a plurality of lenses that focus light transmitted from an object onto a plurality of different pixel regions of the image sensor, each lens focusing light on a different one of the pixel regions. It also includes a processor for analyzing the pixel regions to generate a 3D image of the object and tracking 3D motion of the object through a plurality of images successively obtained with the image sensor.

This system and other implementations of the technology disclosed include one or more the following features and/or features described in connection with additional methods disclosed.

The single image sensor can be an infrared or ultraviolent sensor with enhanced sensitivity in an infrared or ultraviolent wavelength band.

The system can further include a processor coupled to the image sensor that generates a depth map that calculates depth values for pixels of at least the object, based on the images received in the different pixel regions. The system also includes an object detection module running on a processor that detects 3D motion of the object using the depth values. The processor coupled to the image sensor can further map the object into voxels in 3D space based on the depth map.

The system can have the plurality of lenses are positioned next to each other. The lenses can comprise convex lenses. The system can also have an array of light-sensing pixels that has an aspect ratio larger than one. It can also include the distance between the image sensor and the plurality of lenses being determined based on a distance between the object and the lenses.

In yet another implementation, a method of image capture and analysis for use with a camera oriented toward a field of view is described. The camera includes a single image sensor including an array of uniformly and continuously spaced light-sensing pixels and a plurality of lenses that focus light transmitted from an object onto a plurality of different pixel regions of the image sensor, each lens focusing light on a different one of the pixel regions. The method also includes illuminating the field of view with at least one light source disposed on a same side of the field of view as the camera, operating the camera to capture a plurality of images, each image associated with one of the pixel regions of the image sensor, at a time when the light source is simultaneously operative to illuminate the field of view, analyzing the pixel regions to generate a 3D image of the object, and tracking 3D motion of the object through a plurality of images successively obtained with the image sensor.

This method and other implementations of the technology disclosed include one or more the following features and/or features described in connection with additional methods disclosed.

The single image sensor can be an infrared or ultraviolent sensor with enhanced sensitivity in an infrared or ultraviolent wavelength band.

The method can further include a processor coupled to the image sensor that generates a depth map that calculates depth values for pixels of at least the object, based on the images received in the different pixel regions. The method also includes an object detection module running on a processor that detects 3D motion of the object using the depth values. The processor coupled to the image sensor can further map the object into voxels in 3D space based on the depth map.

The method can have the plurality of lenses are positioned next to each other. The lenses can comprise convex lenses. The method can also have an array of light-sensing pixels that has an aspect ratio larger than one. It can also include the distance between the image sensor and the plurality of lenses being determined based on a distance between the object and the lenses.

Other implementations include non-transitory computer readable storage medium storing instructions executable by a processor to perform any of the methods described above. Another implementation includes non-transitory computer readable storage medium storing instructions executable while via processor that when combined with suitable hardware produce any of the systems or devices described herein.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein may be used without departing from the spirit and scope of the technology disclosed. Accordingly, the described implementations are to be considered in all respects as only illustrative and not restrictive.

What is claimed is:

1. A camera for capturing images of an object, the camera comprising:
   a single image sensor including an array of uniformly and continuously spaced light-sensing pixels;
   a plurality of lenses that focus light transmitted from an object onto a plurality of different pixel regions of the image sensor, each lens focusing light on a different one of the pixel regions; and
   a controller, including a processor and an object detection module, coupled to the single image sensor that:
      analyzes the pixel regions to generate a three-dimensional (3D) image of the object through a plurality of images successively obtained with the image sensor;

generates a depth map that calculates depth values for pixels of at least the object, based on the images received in the different pixel regions;

detects 3D motion of the object using the depth values;

creates a reconstructed 3D model of the object based on the 3D image; and tracks 3D motion of the object based on the 3D model.

2. The camera of claim 1, wherein the single image sensor is an infrared sensor with enhanced sensitivity in an infrared wavelength band.

3. The camera of claim 1, wherein the single image sensor is an ultraviolet sensor with enhanced sensitivity in an ultraviolet wavelength band.

4. The camera of claim 1, further comprising:

the processor coupled to the image sensor that further maps the object into voxels in 3D space based on the depth map.

5. The camera of claim 1, wherein the lenses are positioned next to each other.

6. The camera of claim 1, wherein the lenses comprise convex lenses.

7. The camera of claim 1, wherein the array of uniformly and continuously spaced light-sensing pixels has an aspect ratio larger than one.

8. The camera of claim 1, wherein a distance between the image sensor and the plurality of lenses is determined based on a distance between the object and the lenses.

9. A method of capturing images of an object using a camera comprising an image sensor having an array of light-sensing pixels and a plurality of lenses, each lens focusing light on one of pixel regions of the image sensor, the method comprising:

focusing light transmitted from the object onto a plurality of different pixel regions of the image sensor;

capturing a plurality of images, each associated with one of the pixel regions of the image sensor;

generating a three-dimensional (3D) image of the object based on the images;

generating a depth map that calculates depth values for pixels of at least the object, based on the images received in the different pixel regions;

detecting 3D motion of the object using the depth values;

creating a reconstructed 3D model of the object based on the 3D image; and tracking 3D motion of the object based on the 3D model.

10. An image capture and analysis system comprising:

a camera oriented toward a field of view, the camera comprising:

a single image sensor including an array of uniformly and continuously spaced light-sensing pixels; and a plurality of lenses that focus light transmitted from an object onto a plurality of different pixel regions of the image sensor, each lens focusing light on a different one of the pixel regions;

a processor for analyzing the pixel regions to generate a three-dimensional (3D) image of the object through a plurality of images successively obtained with the image sensor, generating a depth map that calculates depth values for pixels of at least the object, based on the images received in the different pixel regions, detecting 3D motion of the object using the depth values, creating a reconstructed 3D model of the object based on the 3D image and tracking 3D motion of the object based on the 3D model.

11. A method of image capture and analysis for use with a camera oriented toward a field of view, the camera comprising a single image sensor including an array of uniformly and continuously spaced light-sensing pixels and a plurality of lenses that focus light transmitted from an object onto a plurality of different pixel regions of the image sensor, each lens focusing light on a different one of the pixel regions, the method comprising:

illuminating the field of view with at least one light source disposed on a same side of the field of view as the camera;

operating the camera to capture a plurality of images, each image associated with one of the pixel regions of the image sensor, at a time when the light source is simultaneously operative to illuminate the field of view;

analyzing the pixel regions to generate a three-dimensional (3D) image of the object through a plurality of images successively obtained with the image sensor;

generating a depth map that calculates depth values for pixels of at least the object, based on the images received in the different pixel regions;

detecting 3D motion of the object using the depth values;

creating a reconstructed 3D model of the object based on the 3D image; and tracking 3D motion of the object based on the 3D model.

* * * * *